US007595855B2

(12) United States Patent
Lee et al.

(10) Patent No.: US 7,595,855 B2
(45) Date of Patent: Sep. 29, 2009

(54) LIQUID CRYSTAL DISPLAY AND MANUFACTURING METHOD THEREOF

(75) Inventors: Yeong-Beom Lee, Cheonan-si (KR); Kook-Hyun Choi, Seoul (KR); Kyung-Seop Kim, Suwon-si (KR); Yong-Eui Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 231 days.

(21) Appl. No.: 11/492,424

(22) Filed: Jul. 25, 2006

(65) Prior Publication Data

US 2007/0070287 A1 Mar. 29, 2007

(30) Foreign Application Priority Data

Sep. 29, 2005 (JP) ..................... 10-2005-0091141

(51) Int. Cl.
*G02F 1/1339* (2006.01)
*B29D 11/00* (2006.01)

(52) U.S. Cl. .......................... 349/156; 349/56; 349/58; 349/122; 349/104; 349/106; 349/155; 349/187; 264/1.1; 264/1.7

(58) Field of Classification Search ................ 349/156, 349/56, 58, 138, 122, 123, 125, 155, 187, 349/191, 104, 106, 139; 264/1.1, 1.7, 2.1
See application file for complete search history.

(56) References Cited

U.S. PATENT DOCUMENTS 6,690,445 B2 * 2/2004 Matsumoto ................ 349/155
7,142,277 B2 * 11/2006 Choi et al. ................. 349/155
2002/0167009 A1 * 11/2002 Kim ........................... 257/72
2004/0114087 A1 * 6/2004 Cho et al. .................. 349/155
2007/0002259 A1 * 1/2007 SangChul et al. ........... 349/155
2007/0070287 A1 * 3/2007 Lee et al. .................... 349/156

FOREIGN PATENT DOCUMENTS

| | | |
|---|---|---|
| JP | 7199166 | 4/1995 |
| JP | 123639 | 4/2003 |
| JP | 259985 | 9/2004 |
| KR | 0266208 | 6/2000 |
| KR | 0066620 | 11/2000 |
| KR | 0017244 | 3/2003 |

(Continued)

OTHER PUBLICATIONS

English Abstract for Publication No.: 2003-123639.

(Continued)

*Primary Examiner*—Brian M Healy
(74) *Attorney, Agent, or Firm*—F. Chau & Assoc., LLC

(57) ABSTRACT

A liquid crystal display includes a first substrate, a first electrode formed on the first substrate, a passivation layer formed between the first substrate and the first electrode, a second substrate facing the first substrate, a second electrode formed on the second substrate, a columnar spacer formed between the second substrate and the first substrate, and a liquid crystal layer having liquid crystal molecules vertically aligned with respect to the first and second substrates, and formed between the first and second substrates. The passivation layer and the columnar spacer are made of substantially the same material at the same layer.

10 Claims, 14 Drawing Sheets

FOREIGN PATENT DOCUMENTS

| | | |
|---|---|---|
| KR | 0017248 | 3/2003 |
| KR | 0062363 | 7/2004 |
| KR | 0079566 | 7/2004 |
| KR | 0025812 | 3/2005 |
| KR | 0023668 | 10/2005 |

OTHER PUBLICATIONS

English Abstract for Publication No. : 2003-123639.
English Abstract for Publication No .: 20050023668.
English Abstract for Publication No. : 20040079566.
English Abstract for Publication No. : 20040062363.
English Abstract for Publication No. : 20030017248.
English Abstract for Publication No. : 20030017244.
English Abstract for Publication No. : 20000066620.
English Abstract for Publication No. : 100266208.
English Abstract for Publication No. : 07199166.
English Abstract for Publication No. : 2004459985.

* cited by examiner

LIQUID CRYSTAL DISPLAY AND MANUFACTURING METHOD THEREOF

CROSS-REFERENCE TO RELATED APPLICATION

This Application claims priority from Korean patent application number 10-2005-0091141 filed on Sep. 29, 2005, the contents of which are incorporated herein by reference in their entirety.

BACKGROUND OF THE INVENTION

1. Technical Field

The present invention relates to a liquid crystal display and a method for manufacturing the same and, more particularly, to a liquid crystal display and a method for manufacturing same in which the number of lithography processes is reduced.

2. Discussion of the Related Art

A conventional liquid crystal display (LCD) includes two panels provided with field-generating electrodes such as pixel electrodes and a common electrode, and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

The LCD may have a layered structure including several thin films, and several photolithography processes may be employed in manufacturing the LCD panel.

However, because the photolithography processes include complicated steps, the LCD panels are costly to produce. The production costs and time increase as the number of photolithography processes increase. Therefore, it is desirable to reduce the number of photolithography steps.

SUMMARY OF THE INVENTION

A liquid crystal display includes a first substrate, a first electrode formed on the first substrate, a passivation layer formed between the first substrate and the first electrode, a second substrate facing the first substrate, a second electrode formed on the second substrate, a columnar spacer formed between the second substrate and the first substrate, and a liquid crystal layer having liquid crystal molecules vertically aligned with respect to the first and second substrates, and formed between the first and second substrates. The passivation layer and the columnar spacer are made of substantially the same material at the same layer.

The liquid crystal display may further include a gate line and a data line formed on the first substrate, and a thin film transistor connected to the gate line and the data line.

A color filter may be formed on the second substrate of the liquid crystal display, or a light-blocking member may be formed thereon.

The second electrode may include a plurality of cutouts.

The liquid crystal display may further include a slope member formed between the passivation layer and the first electrode. The slope member may include a ridge protruding upward and an inclined surface. The ridge and the cutouts of the second electrode may be alternatively arranged.

The slope member, the passivation layer, and the columnar spacers may be made of the same layer and of substantially the same material. The slope member, the passivation layer, and the columnar spacers may be formed by a mold.

A method for manufacturing a liquid crystal display includes coating an organic layer on a substrate, pressing the organic layer by using a mold, forming a thin film by absorbing solvent from the organic layer into the mold to harden the organic layer, and removing the mold from the substrate.

The method may further include removing a pressed portion of the organic layer after the removal of the mold, or soft-baking the mold while absorbing solvent from the organic layer and the organic layer to further harden the organic layer before removing the mold.

The thin film may include a passivation layer having a contact hole, it may include a slope member and a columnar spacer, or it may include a passivation layer having a contact hole, a slope member, and a columnar spacer.

The mold may include polydimethylsiloxane.

BRIEF DESCRIPTION OF THE DRAWINGS

Exemplary embodiments of the present invention can be understood in more detail from the following descriptions taken in conjunction with the accompanying drawings in which.

DETAILED DESCRIPTION OF EXEMPLARY EMBODIMENTS

Exemplary embodiments of the present invention now will be described more fully hereinafter with reference to the accompanying drawings, in which exemplary embodiments of the invention are shown. The present invention may, however, be embodied in many different forms and should not be construed as limited to the embodiments set forth herein. Like numerals refer to like elements throughout.

Figure 1:
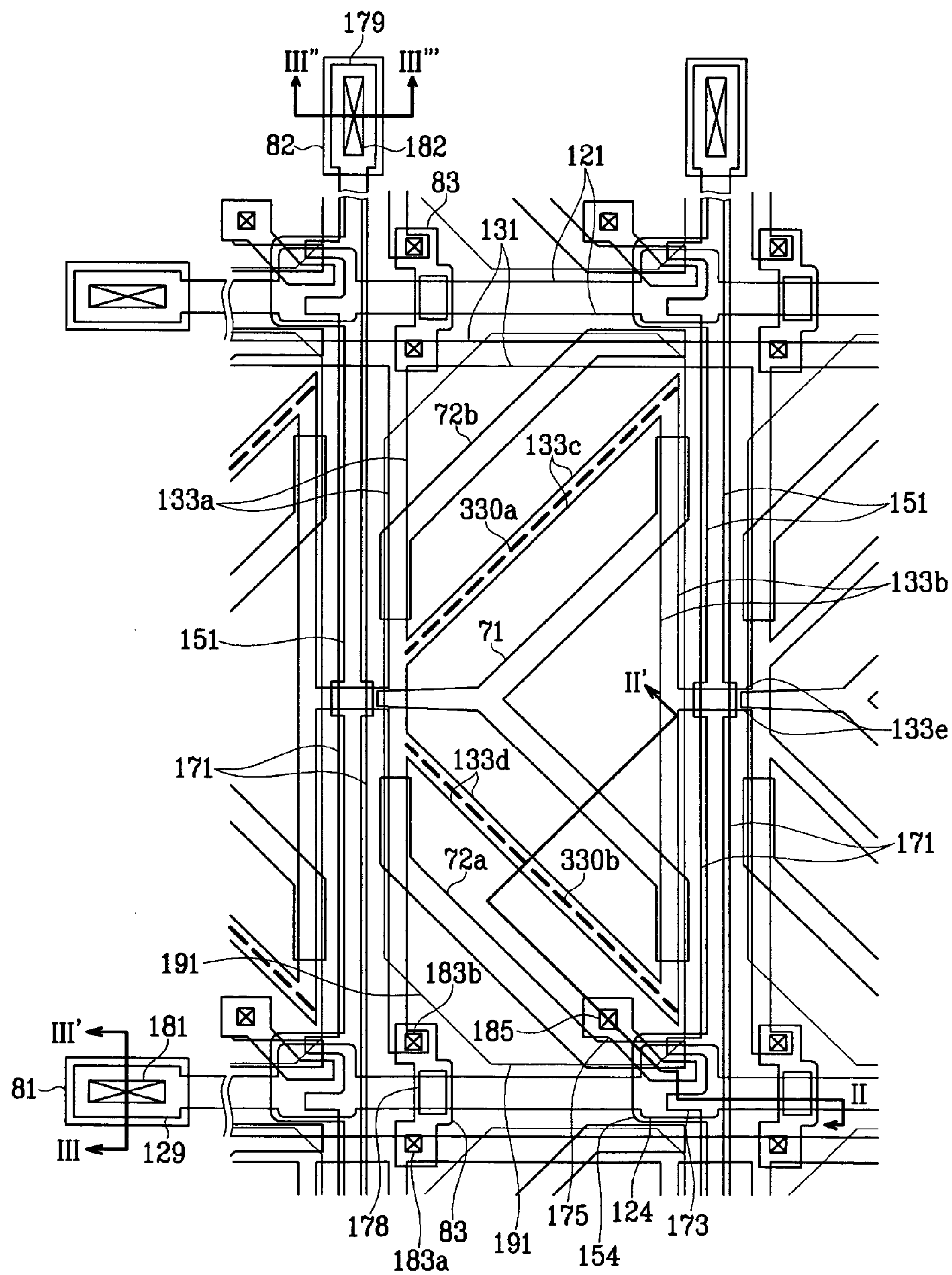
FIG. 1 shows a layout view of an LCD according to an embodiment of the present invention.

An LCD according to an embodiment of the present invention will be described in detail with reference to FIGS. 1-3. FIG. 1 shows a layout view of an LCD according to an embodiment of the present invention, FIG. 2 shows a sectional view of the LCD of FIG. 1 taken along the line II-II', and FIG. 3 shows sectional views of the LCD of FIG. 1 taken along the lines III-III' and III''-III'''.

Figure 2:
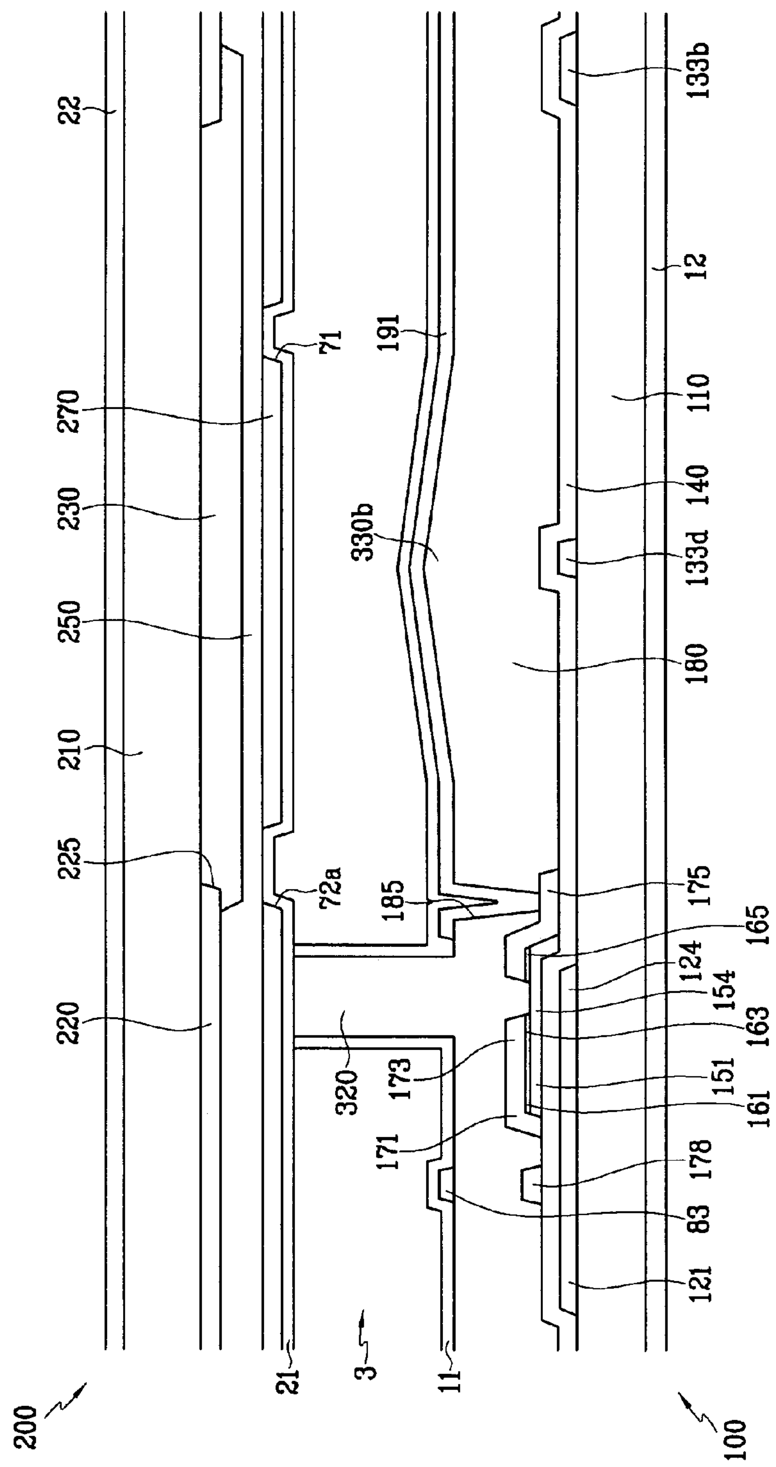
FIG. 2 shows a sectional view of the LCD of FIG. 1 taken along the line II-II'.
Figure 3:
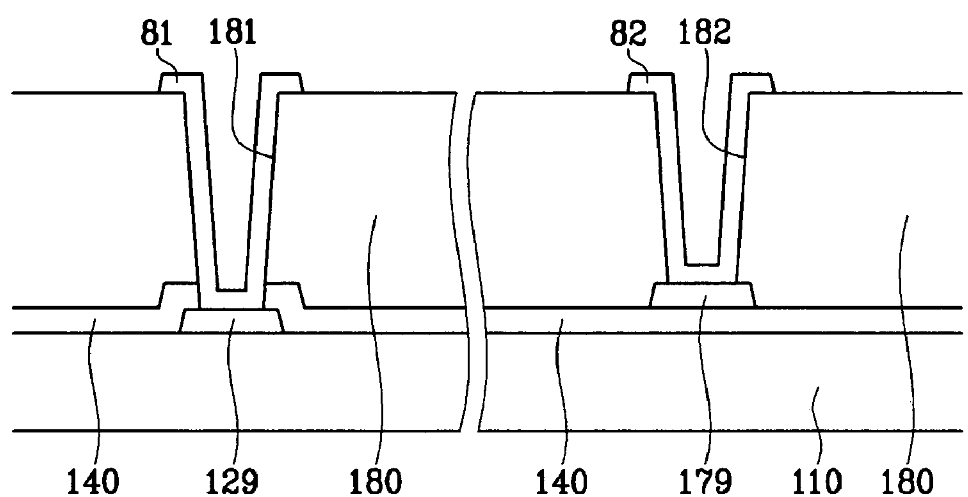
FIG. 3 shows sectional views of the LCD of FIG. 1 taken along the lines III-III ' and III''-III'''.

Referring to FIGS. 1-3, an LCD according to an embodiment of the present invention includes a thin film transistor (TFT) array panel 100, a common electrode panel 200, and an LC layer 3 interposed between the TFT array and common electrode panels 100 and 200.

A plurality of gate lines 121 and a plurality of storage electrode lines 131 are formed on an insulating substrate 110 made of a material such as transparent glass.

The gate lines 121 extend substantially in a transverse direction, are separated from each other and transmit gate signals. Each gate line 121 includes a plurality of projections forming a plurality of gate electrodes 124 and an end portion 129 having a large area for contact with another layer (not shown) or an external driving circuit (not shown). A gate driving circuit (not shown) for generating the gate signals may be mounted on a flexible printed circuit (FPC) film (not shown), which may be attached to the insulating substrate 110, directly mounted on the insulating substrate 110, or integrated with the insulating substrate 110. The gate lines 121 may extend to be connected to a driving circuit (not shown) that may be integrated with the insulating substrate 110.

Each storage electrode line 131 extends substantially in the transverse direction and is disposed between two adjacent gate lines 121 and close to an upper one of the two gate lines 121. Each storage electrode line 131 includes a plurality of branches forming first through fourth storage electrodes 133*a*-133*d*, wherein storage electrode connections 133*e* connect the first and second storage electrodes 133*a* and 133*b*.

The first and second storage electrodes 133*a* and 133*b* are disposed longitudinally and are spaced apart from each other, and the third and fourth storage electrodes 133*c* and 133*d* are disposed obliquely and are connected between the first and second storage electrodes 133*a* and 133*b*. In detail, the first storage electrode 133*a* has a free end portion and a fixed end portion that is connected to the storage electrode line 131, and has a projection. The third and fourth storage electrodes 133*c* and 133*d* extend approximately from a center of the first storage electrode 133*a* to upper and lower ends of the second storage electrode 133*b*, respectively.

The storage electrode lines 131 are supplied with a predetermined voltage such as a common voltage, which is applied to a common electrode 270 on the common electrode panel 200 of the LCD. Each storage electrode line 131 may include a pair of stems extending in the transverse direction, and may have various shapes and arrangements.

The gate lines 121 and the storage electrode lines 131 are preferably made of an Al-containing metal such as Al and an Al alloy, a Ag-containing metal such as Ag and a Ag alloy, a Cu-containing metal such as Cu and a Cu alloy, a Mo-containing metal such as Mo and a Mo alloy, Cr, Ta, or Ti. However, they may have a multi-layered structure including two conductive films (not shown) having different physical characteristics. One of the two conductive films is preferably made of a low resistivity metal including, for example, an Al-containing metal, a Ag-containing metal, and/or a Cu-containing metal for reducing signal delay or voltage drop. The other conductive film is preferably made of a material such as a Mo-containing metal, Cr, Ta, or Ti, which has good physical, chemical, and electrical contact characteristics with other materials such as indium tin oxide (ITO) or indium zinc oxide (IZO). Good examples of the combination of the two conductive films are a lower Cr conductive film and an upper Al (alloy) conductive film and a lower Al (alloy) conductive film and an upper Mo (alloy) conductive film. However, the gate lines 121 and the storage electrode lines 131 may be made of various metals or conductors.

In addition, the lateral sides of the gate lines 121 and the storage electrode lines 131 are inclined relative to a surface of the substrate, and the inclination angle thereof ranges from about 30 degrees to about 80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 124. The semiconductor stripes 151 become wide near the gate lines 121 and the storage electrode lines 131 such that the semiconductor stripes 151 cover the gate lines 121 and the storage electrode lines 131.

A plurality of ohmic contact stripes and islands 161 and 165 are formed on the semiconductor stripes 151. The ohmic contact stripes and islands 161 and 165 are preferably made of n+ hydrogenated a-Si heavily doped with an n-type impurity such as phosphorous, or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contact stripes and islands 161 and 165 are tapered, and the inclination angles thereof range from about 30 degrees to about 80 degrees.

A plurality of data lines 171, a plurality of drain electrodes 175 that are separated from the data lines 171, and a plurality of isolated metal pieces 178 are formed on the ohmic contact stripes and islands 161 and 165 and the gate insulating layer 140.

The data lines 171 for transmitting data voltages extend substantially in the longitudinal direction and cross the gate lines 121 at right angles. The data lines 171 also intersect the storage electrode lines 131 and the storage electrode connections 133*e* such that each data line 171 is disposed between adjacent first and second storage electrodes 133*a* and 133*b*. Each data line 171 includes an end portion 179 having a large area for contact with another layer or an external device. Each data line 171 includes a plurality of source electrodes projecting toward the drain electrodes 175. A data driving circuit (not shown) for generating the data signals may be mounted on an FPC film (not shown), which may be attached to the insulating substrate 110, directly mounted on the insulating substrate 110, or integrated with the insulating substrate 110. The data lines 171 may extend to be connected to a driving circuit that may be integrated with the insulating substrate 110.

Each drain electrode 175 includes an end portion having a large area for contact with another layer, and another end portion disposed on a gate electrode 124 and partly enclosed by a source electrode 173.

A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The metal pieces 178 are disposed on the gate lines 121 near the end portions of the first storage electrodes 133*a*.

The data lines 171, the drain electrodes 175, and the metal pieces 178 are preferably made of a refractory metal such as Cr, Mo, Ti, Ta, or alloys thereof. However, they may also have a multilayered structure including a low-resistivity film (not shown) and a good-contact film (not shown). A good example of the combination is a lower Mo film, an intermediate Al film, and an upper Mo film as well as the above-described combinations of a lower Cr film and an upper Al alloy film and a lower Al film and an upper Mo film. However, the data lines 171 and the drain electrodes 175 may be made of various metals or conductors.

Like the gate lines 121 and the storage electrode lines 131, the data lines 171 and the drain electrodes 175 have tapered lateral sides, and the inclination angles thereof range from about 30 degrees to about 80 degrees.

The ohmic contact stripes and islands 161 and 165 are interposed only between the underlying semiconductor stripes 151 and the overlying data lines 171 and the overlying drain electrodes 175 thereon, and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 and the storage electrode lines 131 as described above, to smooth the profile of the surface, thereby preventing the disconnection of the data lines 171.

A passivation layer 180, preferably made of an inorganic or organic insulator, may have a flat top surface. Examples of the inorganic insulator include silicon nitride and silicon oxide. The organic insulator may have photosensitivity and a dielectric constant less than about 4.0. The passivation layer 180 may include a lower film of an inorganic insulator and an upper film of an organic insulator such that it takes the excellent insulating characteristics of the organic insulator while protecting the exposed portions of the semiconductor stripes 151 from being damaged by the organic insulator.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 181 exposing the end portions 129 of the gate lines 171, a plurality of contact holes **183*a* exposing portions of the storage electrode lines 131 near the fixed end portions of the first storage electrodes 133*a*, and a plurality of contact holes 183*b* exposing the projections of the free end portions of the first storage electrodes 133*a***.

A plurality of columnar spacers 320 and a plurality of slope members **330*a* and 330*b* are formed in the passivation layer 180**.

The columnar spacers 320 and the slope members **330*a* and 330*b* may be made of the same layer as the passivation layer 180, and may be made of the same material as that of the passivation layer 180**.

The slope members **330*a* and 330*b* include a ridge indicated by a thick dotted line in FIG. 1, and an inclined surface of which the height is gradually reduced from the ridge to the edge of the slope members 330*a* and 330*b*. The ridge of the slope members 330*a* and 330*b* substantially has inversion symmetry with respect to an imaginary transverse line bisecting the pixel electrode 191**.

The ridges of the lower and upper slope members **330*a* and 330*b* obliquely extend from a right edge of the pixel electrode 191 near an upper right corner approximately to a center of a left edge of the pixel electrode 191, and overlap the third and fourth storage electrodes 133*c* and 133*d*. The lower and upper slope members 330*a* and 330*b* are disposed at lower and upper halves of the pixel electrode 191, respectively, which can be divided by the imaginary transverse line. The ridges of the lower and upper slope members 330*a* and 330*b* make an angle of about 45 degrees with the gate lines 121**, and they extend substantially perpendicular to each other.

The columnar spacers 320 support the interval between the TFT array panel 100 and the common electrode panel 200 along with the passivation layer 180.

A plurality of pixel electrodes 191, a plurality of contact assistants 81 and 82, and a plurality of overpasses 83, which are preferably made of a transparent conductor such as ITO or IZO or a reflective conductor such as Ag or Al, are formed on the passivation layer 180 and the slope members **330*a* and 330*b***.

The pixel electrodes 191 are physically and electrically connected to the drain electrodes 175 through the contact holes 185 such that the pixel electrodes 191 receive the data voltages from the drain electrodes 175.

The pixel electrodes 191 are supplied with the data voltages and generate electric fields in cooperation with the common electrode 270, which determine orientations of liquid crystal molecules (not shown) in the liquid crystal layer 3.

A pixel electrode 191 and the common electrode 270 form a liquid crystal capacitor, which stores applied voltages after deactivation of the TFT. An additional capacitor called a "storage capacitor," which is connected in parallel with the liquid crystal capacitor, is provided for enhancing the voltage storing capacity. The storage capacitors are implemented by overlapping the pixel electrodes 191 with the storage electrode lines 131 including the first through fourth storage electrodes **133*a*-133*d***.

Each pixel electrode 191 is chamfered at its left corners, and the chamfered edges of the pixel electrode 191 make an angle of about 45 degrees with the gate lines 121.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and complement the adhesion of the end portions 129 and 179 and external devices.

The overpasses 83 cross over the gate lines 121 and are connected to the exposed projection of the fixed end portions of the first storage electrodes **133*a* and the exposed portions of the storage electrode lines 131 through the contact holes 183*b* and 183*a*, respectively, which are disposed opposite each other with respect to the gate lines 121. The overpasses 83 overlap the metal pieces 178, and may be electrically connected to the metal pieces 178. The storage electrode lines 131 including the first through fourth storage electrodes 133*a*-133*d* along with the overpasses 83 and the metal pieces 178 are used for repairing defects in the gate lines 121, the data lines 171, or the TFTs. The electrical connection between the gate lines 121 and the storage electrode lines 131 for repairing the gate lines 121 is obtained by illuminating the crossing points of the gate lines 121 and the overpasses 83 with a laser beam to electrically connect the gate lines 121 to the overpasses 83. In this case, the metal pieces 178 enhance the electrical connection between the gate lines 121 and the overpasses 83**.

A description of the common electrode panel 200 follows with reference to FIGS. 1 and 2.

A light-blocking member 220 called a black matrix for preventing light leakage is formed on an insulating substrate 210 made of a material such as transparent glass. The light-blocking member 220 may include a plurality of openings 225 that face the pixel electrodes 191 and may have substantially the same planar shape as the pixel electrodes 191. Otherwise, the light-blocking member 220 may include linear portions corresponding to the data lines 171 and other portions corresponding to the TFTs.

A plurality of color filters 230 are formed on the flexible substrate 210 and are disposed substantially in the areas enclosed by the light-blocking member 220. The color filters 230 may extend substantially in the longitudinal direction along the pixel column such that they may be stripe shaped. The color filters 230 may represent one of the primary colors such as red, green, or blue colors.

An overcoat 250 for preventing the color filters 230 from being exposed and for providing a flat surface is formed on the color filters 230 and the light-blocking member 220. The overcoat 250 may be omitted.

A common electrode 270, preferably made of a transparent conductive material such as ITO and IZO, is formed on the overcoat 250. The common electrode 270 has a plurality of sets of cutouts including a center cutout 71, a lower cutout 72*a* and an upper cutout 72*b* facing a pixel electrode 191. Each of the cutouts 71-72*b* is disposed between adjacent ridges of the slope members 330*a* and 330*b*, and/or between the slope members 330*a* and 330*b* and a chamfered edge of the pixel electrode 191. In addition, each of the cutouts 71-72*b* has at least an oblique portion extending parallel to the slope members 330*a* and 330*b*. The cutouts 71-72*b* substantially have inversion symmetry with respect to the above-described transverse line bisecting the pixel electrode 191.

Each of the lower and upper cutouts 72*a* and 72*b* includes an oblique portion extending approximately from a left edge of the pixel electrode 191 approximately to lower or upper edges of the pixel electrode 191, and transverse and longitudinal portions extending from respective ends of the oblique portion along edges of the pixel electrode 191, overlapping the edges of the pixel electrode 191, and making obtuse angles with the oblique portion.

The center cutout 71 includes a central transverse portion extending approximately from the left edge of the pixel electrode 191 along the third storage electrode 133*c*, a pair of oblique portions extending from an end of the central transverse portion approximately to a right edge of the pixel electrode and making obtuse angles with the central transverse portion, and a pair of terminal longitudinal portions extending from the ends of the respective oblique portions along the right edge of the pixel electrode 191, overlapping the right edge of the pixel electrode 191, and making obtuse angles with the respective oblique portions.

The number of cutouts 71-72*b* may be varied depending on design factors, and the light-blocking member 220 may also overlap the cutouts 71-72*b* to block the light leakage through the cutouts 71-72*b*.

Alignment layers 11 and 21 that may be homeotropic are coated on inner surfaces of the TFT array and common electrode panels 100 and 200, and polarizers 12 and 22 are provided on outer surfaces of the TFT array and common electrode panels 100 and 200 such that their polarization axes may be crossed and one of the transmissive axes may be parallel to the gate lines 121. One of the polarizers may be omitted when the LCD is a reflective LCD.

The LCD may further include at least one retardation film (not shown) for compensating the retardation of the LC layer 3. The retardation film has birefringence and gives a retardation opposite to that given by the LC layer 3. The retardation film may include a uniaxial or biaxial optical compensation film, and in particular, a negative uniaxial compensation film.

The LCD may further include a backlight unit (not shown) for supplying light to the LC layer 3 through the polarizers 12 and 22, the retardation film, and the TFT array and common electrode panels 100 and 200.

It is preferable that the LC layer 3 has negative dielectric anisotropy and is subjected to a vertical alignment that the LC molecules in the LC layer 3 are aligned such that their long axes are substantially vertical to the surfaces of the TFT array and common electrode panels 100 and 200 in the absence of an electric field.

As shown in FIG. 1, a set of the cutouts 71-72*b* and the slope members 330*a* and 330*b* divides a pixel electrode 191 into a plurality of sub-areas, and each sub-area has two major edges.

The cutouts 71-72*b* and the slope members 330*a* and 330*b* control the tilt directions of the LC molecules in the LC layer 3.

Upon application of the common voltage to the common electrode 270 and a data voltage to the pixel electrodes 191, an electric field substantially perpendicular to the surfaces of the TFT array and common electrode panels 100 and 200 is generated. The LC molecules tend to change their orientations in response to the electric field such that their long axes are perpendicular to the field direction.

The LC molecules are pre-tilted by the slope members 330*a* and 330*b* in the absence of the electric field, and the pre-tilt directions of the LC molecules determines the tilt directions of the LC molecules upon application of the electric field, which coincide with the tilt directions determined by the cutouts 71-72*b* and the chamfered edge of the pixel electrode 191.

In addition, the slope members 330*a* and 330*b* having varying thickness distort the equipotential lines of the electric field, and the distortion of the equipotential lines gives the tilting force which also coincides with the tilt directions determined by the cutouts 71-72*b* when the dielectric constant of the slope members 330*a* and 330*b* is lower than that of the LC layer 3.

Accordingly, the tilt directions of the LC molecules far from the cutouts 71-72*b* and the chamfered edges of the pixel electrodes 191 are also determined to reduce the response time of the LC molecules.

The cutouts 71-72*b* of the common electrode 270, the slope members 330*a* and 330*b* of the passivation layer 180 and the edges of the pixel electrodes 191 distort the electric field to have a horizontal component that is substantially perpendicular to the edges of the cutouts 71-72*b* and the edges of the pixel electrodes 191. Accordingly, the LC molecules on each sub-area are tilted in a direction by the horizontal component and the azimuthal distribution of the tilt directions are localized to four directions, thereby increasing the viewing angle of the LCD.

At least one of the cutouts 71-72*b* can be substituted with protrusions (not shown) or depressions (not shown). The protrusions are preferably made of an organic or inorganic material and disposed on or under the field-generating electrodes 191 or 270.

The shapes and the arrangements of the cutouts 71-72*b* and the slope members 330*a* and 330*b* may be modified.

Since the tilt directions of all domains make an angle of about 45 degrees with the gate lines 121, which are parallel or perpendicular to the edges of the TFT array and common electrode panels 100 and 200, and the 45-degree intersection of the tilt directions and the transmissive axes of the polarizers 12 and 22 gives maximum transmittance, the polarizers 12 and 22 can be attached such that the transmissive axes of the polarizers 12 and 22 are parallel or perpendicular to the edges of the TFT array and common electrode-panels 100 and 200 and it reduces the production cost.

The passivation layer 180, the slope members 330*a* and 330*b*, and the columnar spacers 320 in the LCD according to an embodiment of the present invention may be made of the same layer, and may include substantially the same material.

Now, the manufacturing method for forming the passivation layer 180, the slope members 330*a* and 330*b*, and the columnar spacers 320 is described for the LCD according to an embodiment of the present invention, with reference to FIGS. 4A to 5E.

FIGS. 4A to 4E show sectional views of a passivation layer of an LCD in an intermediate step of a manufacturing method according to an embodiment of the present invention, and FIGS. 5A to 5E show sectional views of a passivation layer, a slope member, and a columnar spacer of an LCD in an intermediate step of a manufacturing method according to an embodiment of the present invention.

Figure 4A:
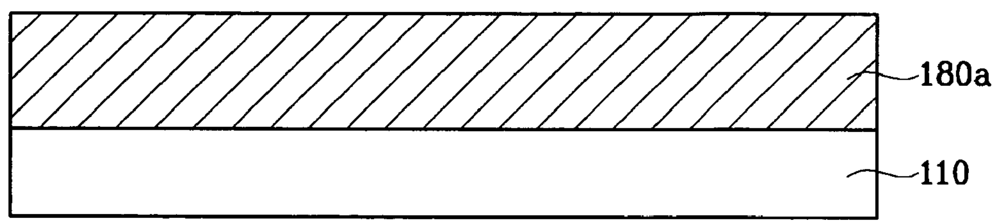
FIGS. 4A to 4E show sectional views of a passivation layer of an LCD in an intermediate step of a manufacturing method according to an embodiment of the present invention.
Figure 4B:
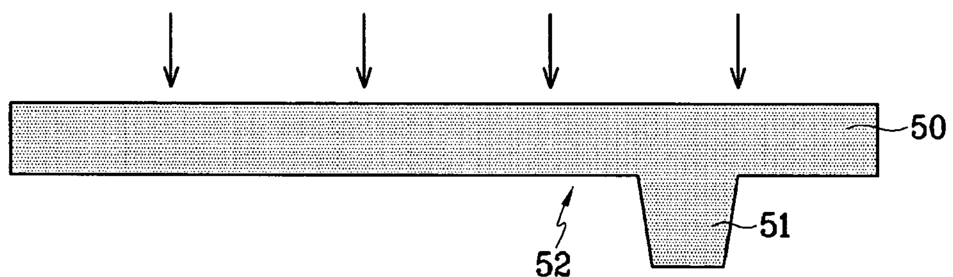
Figure 4B:
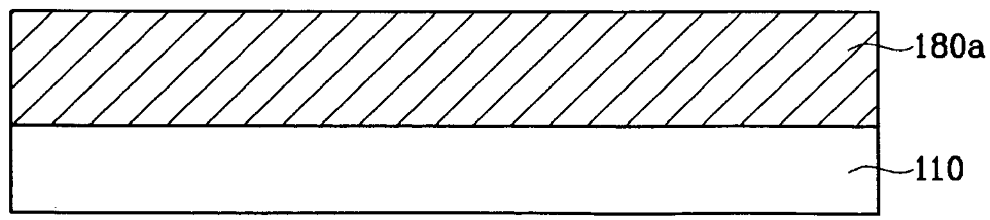

As shown in FIG. 4A, an organic insulating layer 180*a* is coated on an insulating substrate 110 and, as shown in FIG. 4B, a mold 50 having a depression 52 corresponding to the passivation layer 180 (FIGS. 2 and 3) and a projection 51 corresponding to the contact holes 181, 182, 183*a*, 183*b*, and 185 (FIGS. 2 and 3) is aligned with the organic insulating layer 180*a* and presses the organic insulating layer 180*a*. The mold 50 may be formed of polydimethylsiloxane, and the organic insulating layer may include a thermal hardening resin.

Figure 4C:
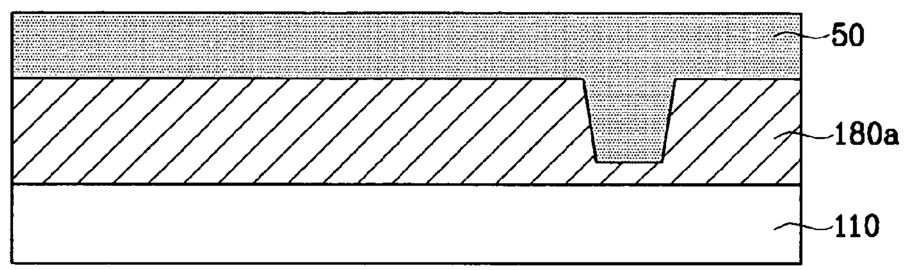

As shown in FIG. 4C, the mold 50 including polydimethylsiloxane absorbs solvent from the organic insulating layer 180*a* during the application of pressure, and the organic insulating layer 180*a* is hardened. Here, a soft-bake treatment may be added to further harden the organic insulating layer 180*a*.

Figure 4D:
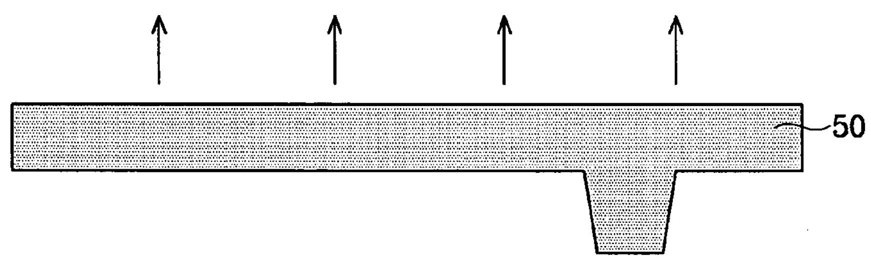
Figure 4D:
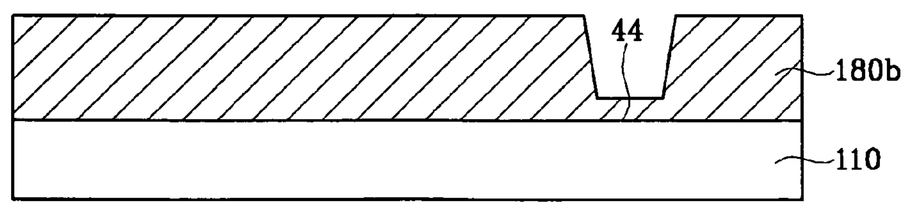
Figure 4E:
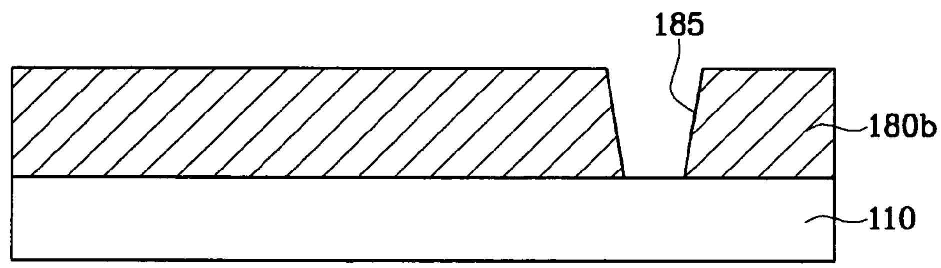

As shown in FIG. 4D, the mold 50 is removed from the hardened organic insulating layer 180*b*, and a portion 44 that is pressed by the mold is dry-etched to complete the contact hole 185, as shown in FIG. 4E.

Because the passivation layer 180 has only the contact holes 181, 182, 183*a*, 183*b*, and 185, the process using the mold 50 is more effective than a photolithography process using a mask for forming the passivation layer 180, and more particularly, the process may reduce production time and costs for manufacturing the LCD by omitting an exposure step and a developing step.

Furthermore, because the exposure step is omitted in this method for forming the passivation layer 180, the organic insulating layer does not include a photo acid generator (PAG). Accordingly, the cost of materials for forming the passivation layer 180 is lower and the deposition of the materials is simplified.

Figure 5A:
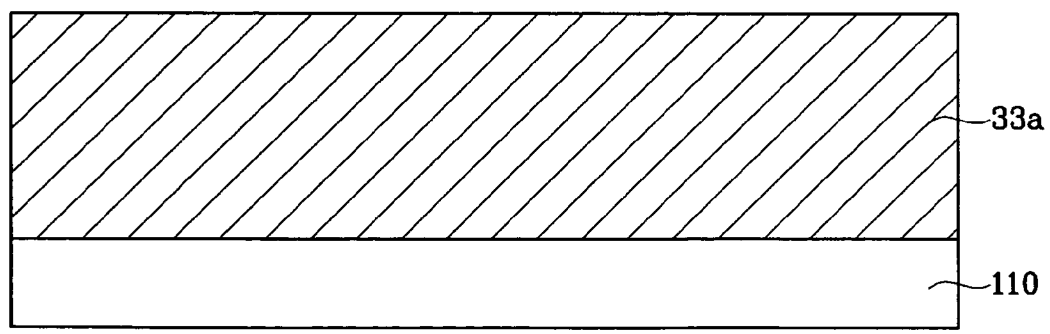
FIGS. 5A to 5E show sectional views of a passivation layer, a slope member and a columnar spacer of an LCD in an intermediate step of a manufacturing method according to an embodiment of the present invention.
Figure 5B:
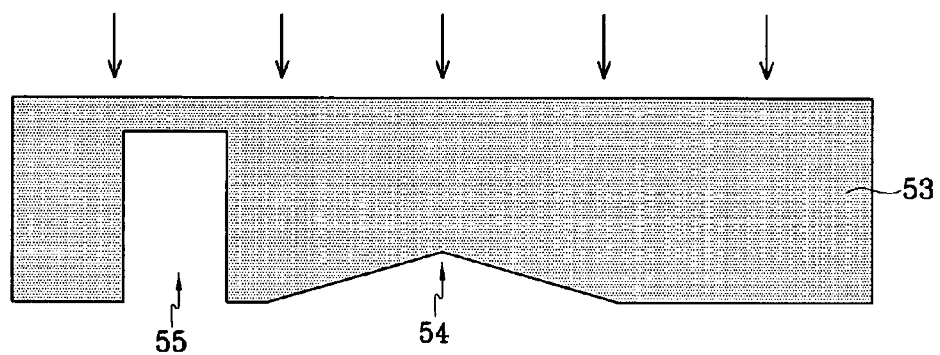
Figure 5B:
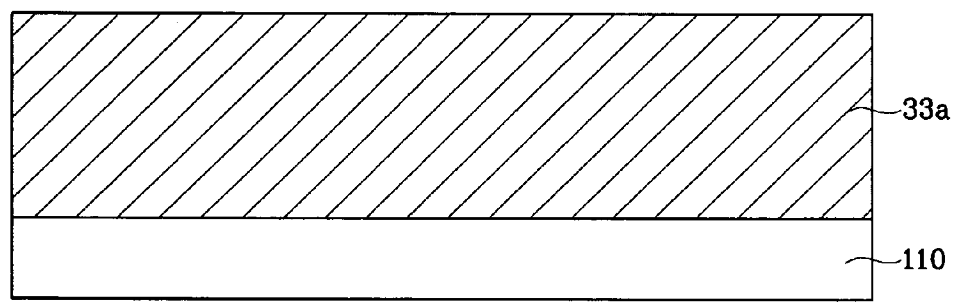

As shown in FIG. 5A, an organic insulating layer 33*a* is coated on an insulating substrate 110 and, as shown in FIG. 5B, a mold 53 having depressions 54 and 55 corresponding to the columnar spacers 320 and the slope members 330*a* and 330*b* of FIGS. 1 and 2 is aligned with the organic insulating layer 33*a* and presses the organic insulating layer 33*a*. The mold 53 may be formed of polydimethylsiloxane, and the organic insulating layer may include a thermal hardening resin.

Figure 5C:
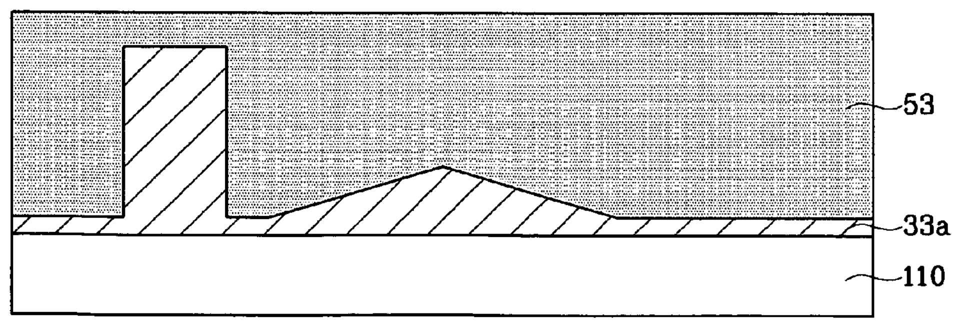

As shown in FIG. 5C, the mold 53 including polydimethylsiloxane absorbs solvent from the organic insulating layer 33*a* during the application of pressure and the organic insulating layer 33*a* is hardened. Here, a soft-bake treatment may be added to further harden the organic insulating layer 33*a*.

Figure 5D:
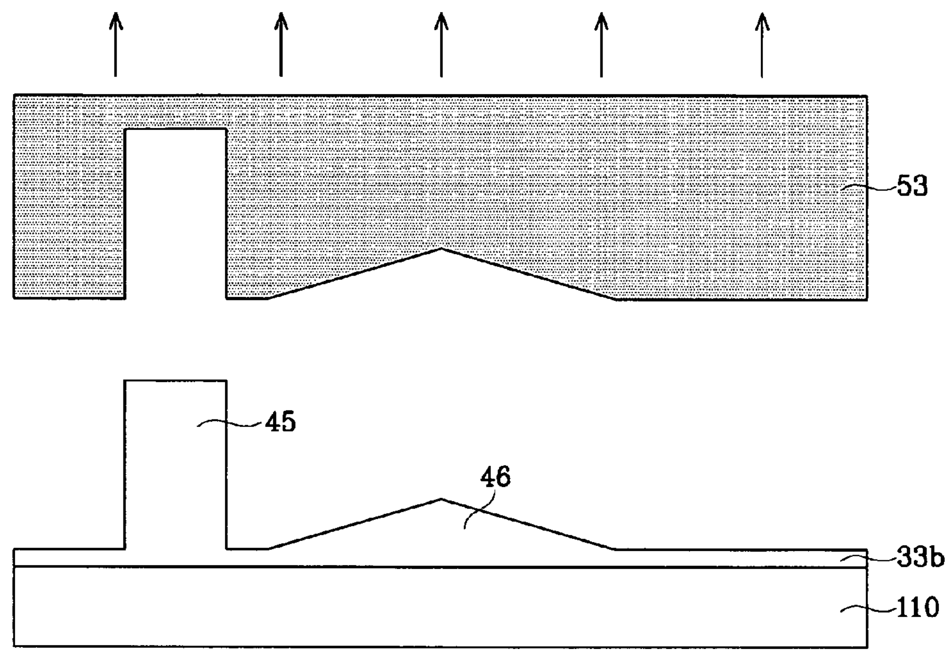
Figure 5E:
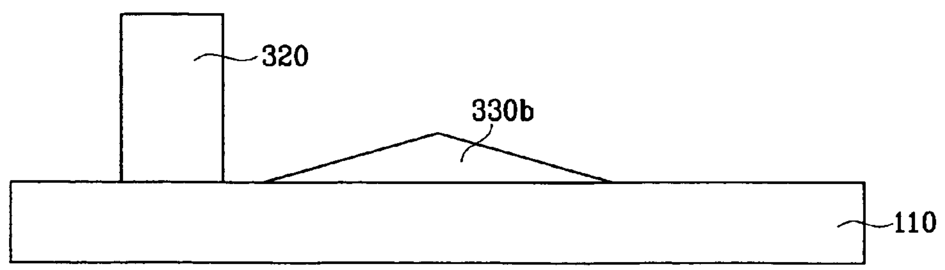

As shown in FIG. 5D, the mold 53 is removed from the hardened organic insulating layer 33*b*, and portions 45 and 46 pressed by the mold 53 are dry-etched to simultaneously complete the columnar spacer 320 and the slope member 330*b*, as shown in FIG. 5E.

This method for manufacturing the columnar spacers 320 and the slope members 330*a* and 330*b* may reduce production time and costs by omitting an exposure step and a developing step. Furthermore, because the exposure step is omitted, the organic insulating layer may omit a PAG. Accordingly, the cost of materials for forming the passivation layer 180 is reduced and the deposition of the materials is simplified.

The passivation layer 180, columnar spacer 320, and the slope members 330*a* and 330*b* are simultaneously formed using one mold according to an embodiment of the present invention, which will be described with reference to FIGS. 6A to 6E.

FIGS. 6A to 6E show sectional views of a passivation layer, a slope member, and a columnar spacer of an LCD in an intermediate step of a manufacturing method according to an embodiment of the present invention.

Figure 6A:
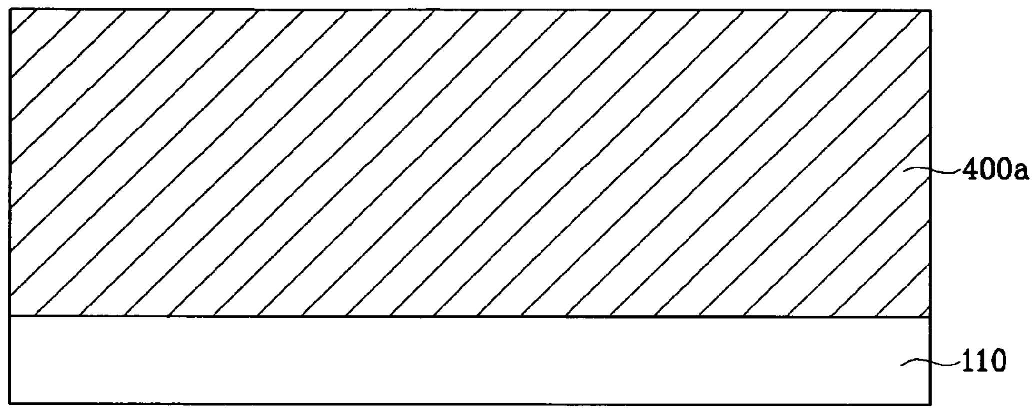
FIGS. 6A to 6E show sectional views of a passivation layer, a slope member, and a columnar spacer of an LCD in an intermediate step of a manufacturing method according to an embodiment of the present invention.
Figure 6B:
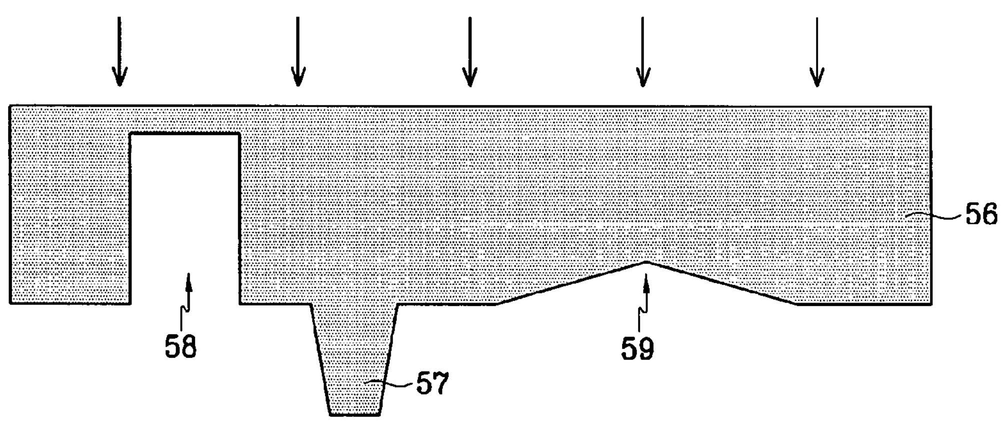
Figure 6B:
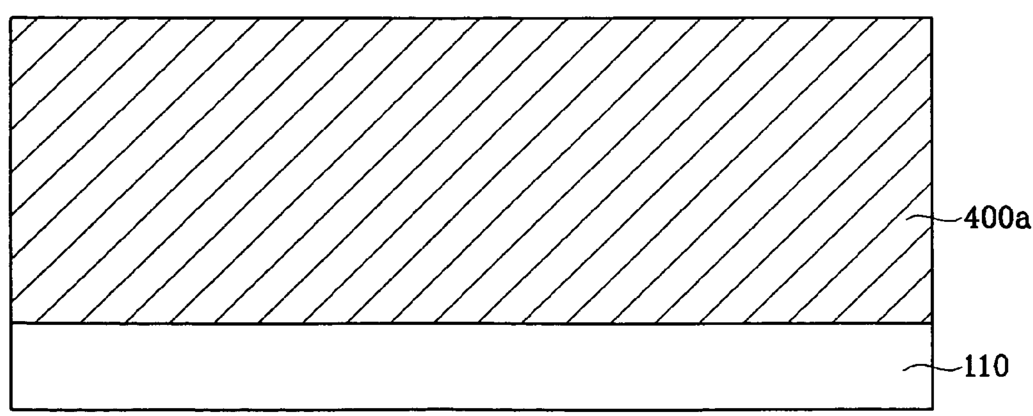

As shown in FIG. 6A, an organic insulating layer 400*a* is coated on an insulating substrate 110, and a mold 56 having depressions 58 and 59 corresponding to the columnar spacer 320 and the slope member 330*b* (FIG. 2) and a projection 57 corresponding to the contact hole 185 is aligned with the organic insulating layer 400*a* and presses the organic insulating layer 400*a*. The mold 56 may be formed of polydimethylsiloxane, and the organic insulating layer may include a thermal hardening resin.

Figure 6C:
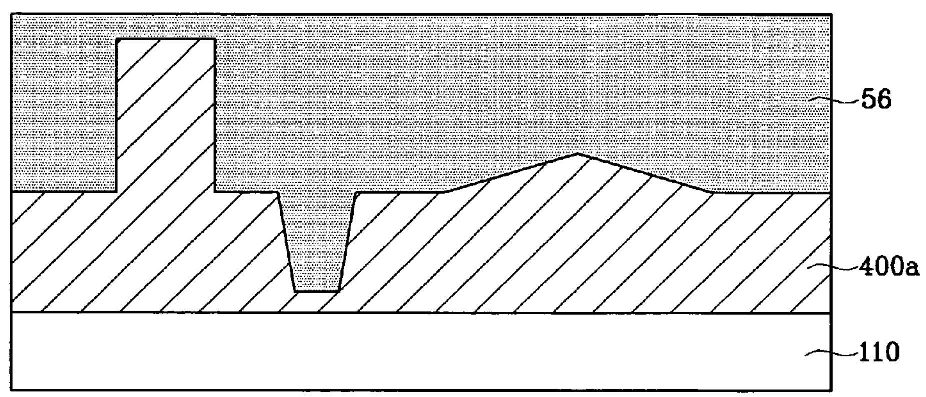

As shown in FIG. 6C, the mold 56 including polydimethylsiloxane soaks up the solvent of the organic insulating layer 400*a* on the application of the pressure and the organic insulating layer 400*a* is hardened. Here, a soft-bake treatment may be added to further harden the organic insulating layer 400*a*.

Figure 6D:
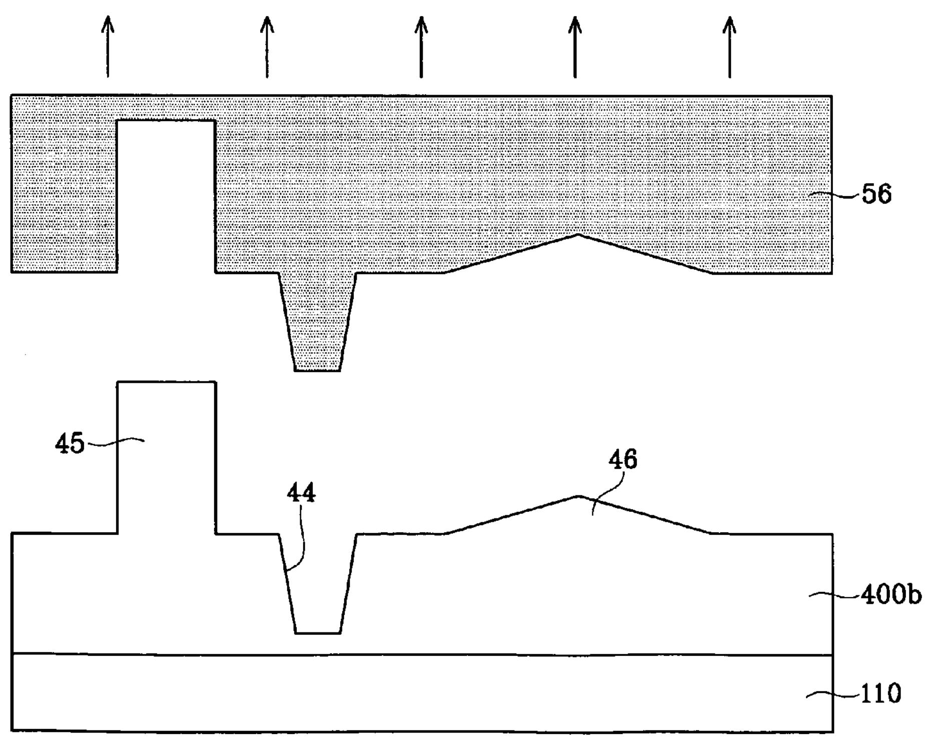
Figure 6E:
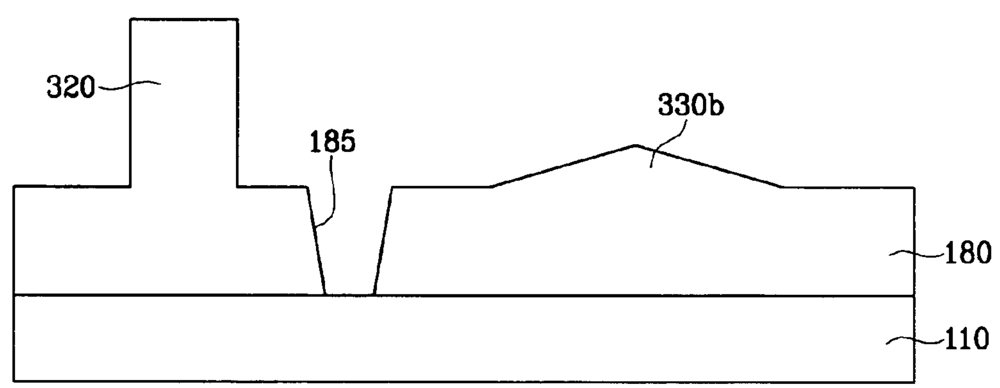

As shown in FIG. 6D, the mold 56 is removed from the harden organic insulating layer 400*b*, and portions 44, 45 and 46 pressed by the mold 56 are dry-etched to simultaneously complete the passivation layer 180 including the contact hole 185, the columnar spacer 320, and the slope members 330*a* and 330*b*, as shown in FIG. 6E.

This method of manufacturing the passivation layer 180, the columnar spacer 320, and the slope member 330*b* may reduce production time and costs by omitting an exposure step and a developing step, compared with the photolithography process.

Furthermore, the passivation layer 180, the columnar spacer 320, and the slope members 330*a* and 330*b* may be simultaneously formed by using one mold, and accordingly production time and costs may be further reduced.

Because the exposure step is omitted in this method for forming the passivation layer 180, the columnar spacer 320, and the slope members 330*a* and 330*b*, the organic insulating layer does not include a PAG. Accordingly, the cost of materials for forming the passivation layer 180 is reduced and the deposition of the materials is simplified.

An LCD according to another embodiment of the present invention will be described in detail with reference to FIGS. 6 and 7.

Figure 7:
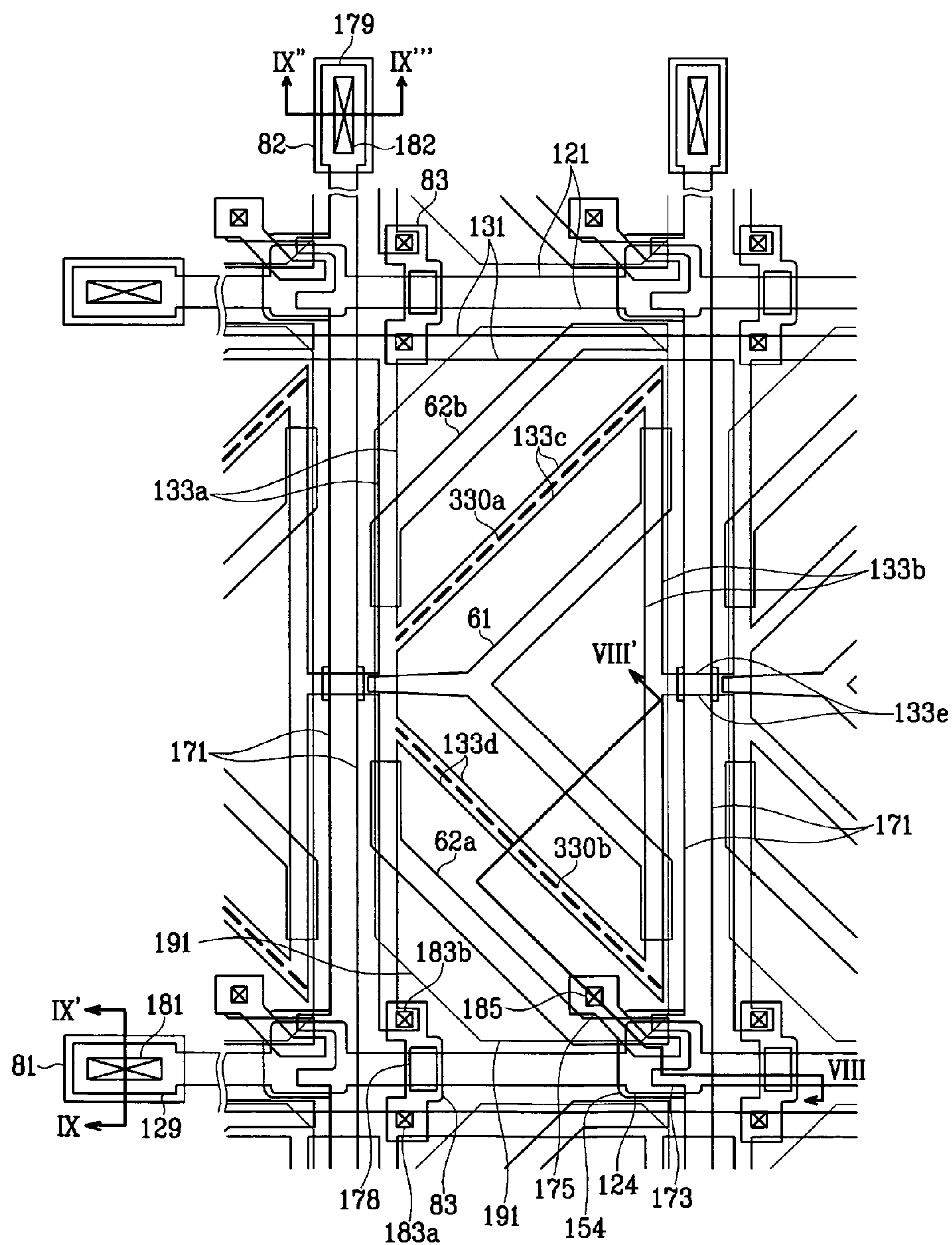
FIG. 7 shows a layout view of an LCD according to an embodiment of the present invention.
Figure 8:
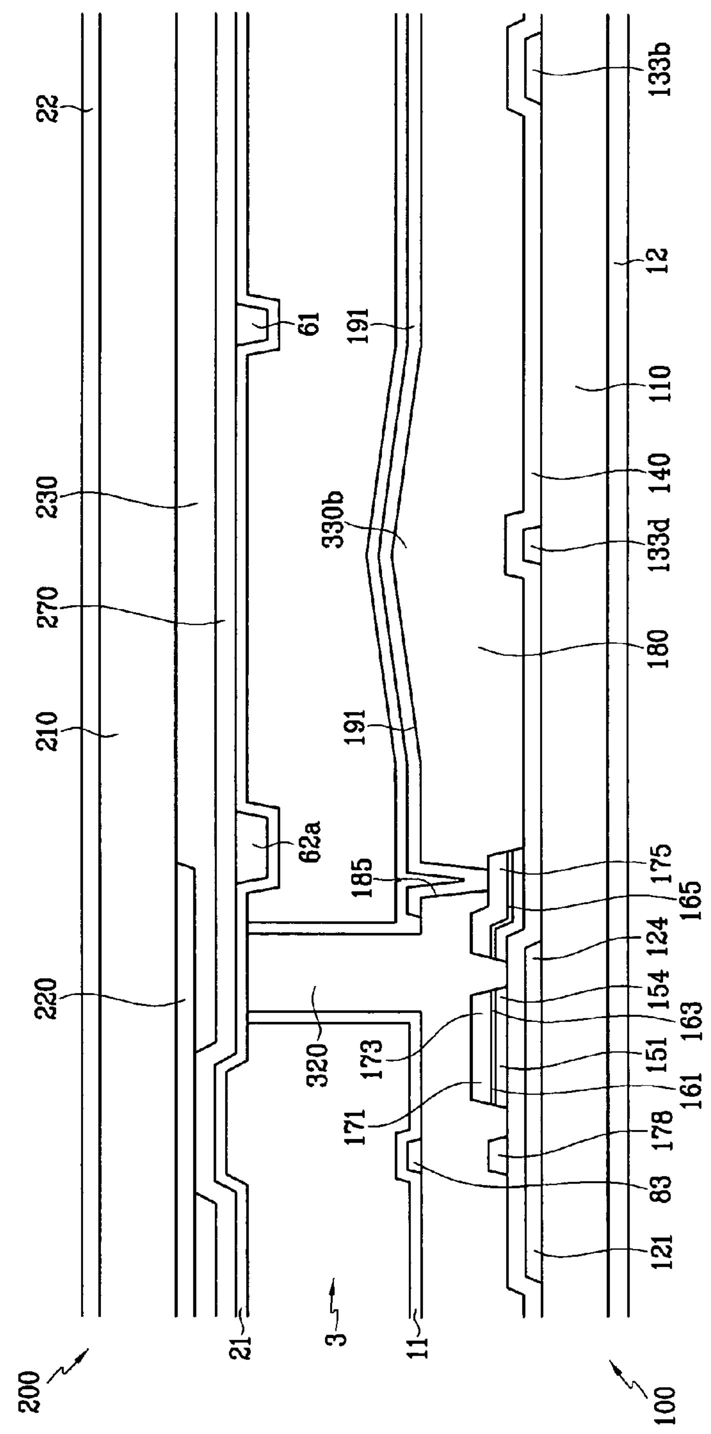
FIG. 8 shows a sectional view of the LCD of FIG. 7 taken along the line VIII-VIII'.
Figure 9:
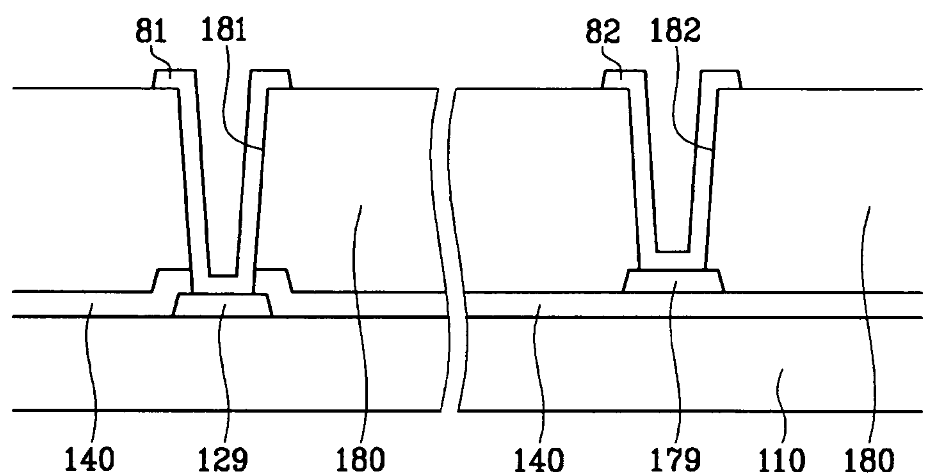
FIG. 9 shows sectional views of the LCD of FIG. 7 taken along the lines IX-IX' and IX''-IX'''.

FIG. 7 shows a layout view of an LCD according to an embodiment of the present invention, FIG. 8 shows a sectional view of the LCD of FIG. 7 taken along the line VIII-VIII', and FIG. 9 shows sectional views of the LCD of FIG. 7 taken along the lines IX-IX' and IX"-IX"'.

Referring to FIGS. 7 to 9, an LCD also includes a TFT array panel 100, a common electrode panel 200, an LC layer 3, a plurality of columnar spacers 320 interposed between the TFT array and common electrode panels 100 and 200, and a pair of polarizers 12 and 22 attached on outer surfaces of the TFT array and common electrode panels 100 and 200.

Layered structures of the TFT array and common electrode panels 100 and 200 according to this embodiment are almost the same as those shown in FIGS. 1-3.

Regarding the TFT array panel 100, a plurality of gate lines 121 including gate electrodes 124 and end portions 129 and a plurality of storage electrode lines 131 connecting with a plurality of first through fourth storage electrodes 133*a*-133*d* and storage electrode connections 133*e* are formed on an insulating substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 178 are formed on the ohmic contact stripes and islands 161 and 165, and a passivation layer 180 is formed thereon. A plurality of contact holes 181, 182, 183*a*, 183*b*, and 185 are provided at the passivation layer 180 and the gate insulating layer 140. A plurality of columnar spacers 320 and a plurality of slope members 330*a* and 330*b* are formed on the passivation layer 180, and a plurality of pixel electrodes 191, a plurality of contact assistants 81 and 82, and a plurality of overpasses 83 are formed on the passivation layer 180 and the slope members 330*a* and 330*b*, and an alignment layer 11 is coated thereon.

Regarding the common electrode panel 200, a light-blocking member 220 having a plurality of openings 225, a plurality of color filters 230, a common electrode 270, and an alignment layer 21 are formed on an insulating substrate 210.

The semiconductor stripes 151 of the TFT array panel 100 according to this embodiment have similar planar shapes as the data lines 171 and the drain electrodes 175 of FIGS. 1-3 as well as the underlying ohmic contact stripes and islands 161 and 165. However, the projections 154 of the semiconductor stripes 151 include some exposed portions, which are not covered with the data lines 171 and the drain electrodes 175, such as portions located between the source electrodes 173 and the drain electrodes 175.

Furthermore, the TFT array panel 100 further includes a plurality of semiconductor islands (not shown) and a plurality of ohmic contact islands (not shown) disposed thereon, which are disposed on the metal pieces 178.

A manufacturing method of the TFT array panel according to an embodiment of the present invention simultaneously forms the data lines 171, the drain electrodes 175, the metal pieces 178, the semiconductors 151, and the ohmic contact stripes and islands 161 and 165 using one photolithography process.

A photoresist pattern for the photolithography process has position-dependent thickness, and in particular, it has first and second portions with decreased thickness. The first portions are located on wire areas that will be occupied by the data lines 171, the drain electrodes 175, and the metal pieces 178, and the second portions are located on channel areas of TFTs.

The position-dependent thickness of the photoresist may be obtained by several techniques, for example, by providing translucent areas on the exposure mask as well as transparent areas and light-blocking opaque areas. The translucent areas may have a slit pattern, a lattice pattern, or have thin film(s) with intermediate transmittance or intermediate thickness. When using a slit pattern, it is preferable that the width of the slits or the distance between the slits is smaller than the resolution of a light exposer used for the photolithography. Another example is to use a reflowable photoresist. In detail, once a photoresist pattern made of a reflowable material is formed by using a normal exposure mask with only transparent areas and opaque areas, it is subject to reflow process to flow onto areas without the photoresist, thereby forming thin portions. As a result, the manufacturing process is simplified by omitting a photolithography step.

Furthermore, the common electrode panel 200 includes a plurality of sets of protrusions including a center protrusion 61, a lower protrusion 62*a*, and an upper protrusion 62*b* disposed on the common electrode 270. The protrusions 61-62*b* are preferably made of an inorganic insulator or an organic insulator.

In addition, the common electrode 270 has no cutouts and thus there is no overcoat, although the omission of the overcoat is optional.

Although there are no cutouts at the common electrode panel 200, the protrusions 61-62*b* can sufficiently play a role of determining tilt directions along with the slope members 330*a* and 330*b* of the thin film transistor panel 100.

The portion of the alignment layer 21 on the protrusions 61-62*b* is also protruded, and has inclined surfaces. Because the alignment layer 21 is homeotropic, the LC molecules are vertically aligned with respect to the surface of the alignment layer 21, and they are pre-tilted by the protrusions 61-62*b* in absence of an electric field.

In addition, because the dielectric constant of the protrusions 61-62*b* is lower than that of the LC layer 3, the protrusions 61-62*b* distort the equipotential lines of the electric field, and the distortion of the equipotential lines gives the tilting force which also coincides with the tilt directions determined by the slope members 330*a* and 330*b*.

Each set of the protrusions 61-62*b* faces a pixel electrode 191 and is located at the same positions as that of the cutouts 71-72*b* of FIGS. 1 to 3.

Like the description of the cutouts 71-72*b* of FIGS. 1-3, a set of the protrusions 61-62*b* and the slope members 330*a* and 330*b* divides a pixel electrode 191 into a plurality of sub-areas and each sub-area has two major edges.

The protrusions 61-62*b*, the slope members 330*a* and 330*b* of the passivation layer 180 and the edges of the pixel electrodes 191 distort the electric field to have a horizontal component that is substantially perpendicular to the edges of the protrusions 61-62*b* and the edges of the pixel electrodes 191. Accordingly, the LC molecules on each sub-area are tilted in a direction by the horizontal component and the azimuthal distribution of the tilt directions are localized to four directions, thereby increasing the viewing angle of the LCD.

The protrusions 61-62*b* may be formed under the common electrode 270.

The passivation layer 180, the columnar spacers 320, and the slope members 330*a* and 330*b* may be formed as in FIGS. 4A-6B, and accordingly production time and cost may be further reduced.

Because the exposure step is omitted in this method for forming the passivation layer 180, the columnar spacers 320, and the slope members 330*a* and 330*b*, the organic insulating layer does not include a PAG. Accordingly, the cost of the materials for forming the passivation layer 180 is lower and the deposition of the materials is simplified.

The omission of the cutouts removes a lithography step for forming cutouts at the common electrode 270.

Many of the above-described features of the LCD shown in FIGS. 1-3 may be appropriate for the TFT array panel shown in FIGS. 7-9.

As described above, the passivation layer, the columnar spacers, and the slope members may be formed using the mold, and accordingly the photolithography process may be omitted such that the production time and the cost may be further reduced.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display, comprising:

a first substrate;

a gate line, a data line and a first electrode formed on the first substrate;

a organic insulating layer formed on the first substrate;

a second substrate facing the first substrate;

a second electrode formed on the second substrate;

a columnar spacer formed on the first substrate; wherein the organic insulating layer and the columnar spacer are made of substantially the same material at the same layer by a mold.

2. The liquid crystal display of claim 1, wherein the organic insulating layer does not include a photo acid generator.

3. The liquid crystal display of claim 2, wherein the organic insulating layer comprises a passivation layer having a contact hole.

4. The liquid crystal display of claim 3, further comprising a slope member formed on the passivation layer.

5. The liquid crystal display of claim 1, wherein the organic insulating layer comprises a passivation layer having a contact hole.

6. The liquid crystal display of claim 5, further comprising a slope member formed on the passivation layer.

7. A method for manufacturing a liquid crystal display, comprising:

coating an organic insulating layer on a substrate;

pressing the organic insulating layer by using a mold;

forming a thin film by absorbing solvent from the organic insulating layer into the mold; and removing the mold from the substrate; wherein the thin film comprises a passivation layer having a contact hole and a columnar spacer.

8. The method of claim 7, wherein the organic insulating layer does not include a photo acid generator.

9. The method of claim 7, wherein the thin film comprises a slope member.

10. The method of claim 8, wherein the mold includes polydimethylsiloxane.

* * * * *

UNITED STATES PATENT AND TRADEMARK OFFICE

CERTIFICATE OF CORRECTION

PATENT NO. : 7,595,855 B2
APPLICATION NO. : 11/492424
DATED : September 29, 2009
INVENTOR(S) : Yeong-Beom Lee et al.

It is certified that error appears in the above-identified patent and that said Letters Patent is hereby corrected as shown below:

On the Title Page, following the Prior Publication Data, should read:

Item (30) Foreign Application Priority Data

Sep. 29, 2005 (KR) ............................10-2005-0091141

Signed and Sealed this

Fifteenth Day of December, 2009

David J. Kappos

David J. Kappos
*Director of the United States Patent and Trademark Office*